United States Patent [19]

Ali

[11] Patent Number: 6,125,414
[45] Date of Patent: Sep. 26, 2000

[54] TERMINATING APPARATUS ADAPTED TO TERMINATE SINGLE ENDED SMALL COMPUTER SYSTEM INTERFACE (SCSI) DEVICES, LOW VOLTAGE DIFFERENTIAL SCSI DEVICES, OR HIGH VOLTAGE DIFFERENTIAL SCSI DEVICES

[75] Inventor: Abbas Ali, Bloomington, Minn.

[73] Assignee: Seagate Technology LLC, Scotts Valley, Calif.

[21] Appl. No.: 09/103,199

[22] Filed: Jun. 23, 1998

Related U.S. Application Data

[60] Provisional application No. 60/057,736, Aug. 28, 1997.

[51] Int. Cl.[7] .............................. H03K 17/16; G06F 13/00
[52] U.S. Cl. ................................ 710/64; 326/30; 710/62; 710/63; 710/131
[58] Field of Search ................................ 326/30; 710/62, 710/63, 64, 131

[56] References Cited

U.S. PATENT DOCUMENTS

| | | | |
|---|---|---|---|
| 5,671,376 | 9/1997 | Bucher et al. | 710/129 |
| 5,680,555 | 10/1997 | Bodo et al. | 710/126 |
| 5,864,715 | 1/1999 | Zani et al. | 395/883 |

OTHER PUBLICATIONS

Bill Travis, "Low–Voltage Differential–Signaling ICs Provide Speed, Impedance Match", *EDN Design Feature*, Jul. 17, 1997, pp. 89–95.

"Information Technology—SCSI Parallel Interface–2 (SPI–2)" *Working Draft American National Standard*, Jan. 22, 1998.

Bill Travis, "Low–voltage differential–signaling ICs provide speed, impedance match", EDN Design Feature, Jul. 17, 1997, pp. 89–95.

*Primary Examiner*—Thomas C. Lee
*Assistant Examiner*—Ilwoo Park
*Attorney, Agent, or Firm*—Westman, Champlin & Kelly, P.A.

[57] ABSTRACT

A terminating apparatus adapted to terminate a parallel small computer system interface (SCSI) disc drive or device is disclosed. The terminating apparatus includes termination circuitry adapted to terminate data/control lines of single ended (SE) SCSI devices, low voltage differential (LVD) SCSI devices and high voltage differential (HVD) SCSI devices. The terminating apparatus also includes a first connector coupled to the termination circuitry and adapted to be coupled to data/control lines of the SCSI device to be terminated through the disc drive connector.

7 Claims, 3 Drawing Sheets

TERMINATING APPARATUS ADAPTED TO TERMINATE SINGLE ENDED SMALL COMPUTER SYSTEM INTERFACE (SCSI) DEVICES, LOW VOLTAGE DIFFERENTIAL SCSI DEVICES, OR HIGH VOLTAGE DIFFERENTIAL SCSI DEVICES

The present application claims the benefit of earlier filed U.S. Provisional Application Ser. No. 60/057,736, entitled SMART LOW VOLTAGE DIFFERENTIAL TERMINATOR, filed Aug. 28, 1997.

BACKGROUND OF THE INVENTION

Parallel small computer system interface (SCSI) devices come in three different interface formats: narrow, wide and single connector attachment (SCA). Each of the three interfaces can be either single-ended (SE) input/output (I/O) or differential I/O. The narrow interface devices transfer 8 bits of information at a time, while the wide and SCA interface devices transfer 16 bits of information at a time. In SE devices, each bit is represented by a single line. In differential devices, two lines are required to transfer each bit.

As the demand for higher data transfer rates continues to increase, SCSI standards have changed. Maximum data transfer rates for SCSI, SCSI-2, SCSI-3 (also know as Ultra SCSI), and Ultra SCSI-2 are 5, 10, 20 and 40 Mega bytes per second, respectively, for a narrow I/O SCSI device. For wide and SCA devices, the data transfer rate is twice that of narrow I/O devices. The main advantage of differential over SE is the reduction of the effects of noise and the achievement of longer distance capability.

Further differences in SCSI devices have evolved with the introduction of low-voltage differential (LVD) signal devices, in comparison to conventional high-voltage differential (HVD) signal devices. LVD devices offer increased data transfer rates with minimal power consumption and improved noise immunity. Consequently, as the above discussion illustrates, a wide variety of different SCSI devices exist in the industry today.

According to the SCSI Parallel Interconnect 2 (SPI-2) proposed standard, each I/O line (control and data lines) must be terminated properly at both ends in order to avoid reflections and to maintain the integrity of the signals. Consequently, SE lines are terminated differently than HVD lines (SCSI, SCSI-2, and SCSI-3 devices) and LVD lines (Ultra SCSI-2 devices). The wide variety of different types of devices having different SCSI I/O formats has presented problems in terminating the devices. For example, when manufacturers of SCSI disc drives test the drives in large numbers, great care must be taken to terminate specific types of SCSI drives with the correct type of termination device. If the termination devices are included in a test rack or bed, the particular test rack may then only be able to test specific types of SCSI disc drives. This constrains the manufacturer, requiring dedicated test racks having specific termination devices, and thus increasing costs.

The present invention provides a solution to this and other problems, and offers other advantages over the prior art.

SUMMARY OF THE INVENTION

The present invention relates to small computer system interface (SCSI) devices, such as disc drives, and to apparatus for terminating the same.

In accordance with one embodiment of the invention, a terminating apparatus adapted to terminate a parallel small computer system interface (SCSI) disc drive or device is disclosed. The terminating apparatus includes termination circuitry adapted to terminate data/control lines of single ended (SE) SCSI devices, low voltage differential (LVD) SCSI devices and high voltage differential (HVD) SCSI devices. The terminating apparatus also includes a first connector coupled to the termination circuitry and adapted to be coupled to data/control lines of the SCSI device to be terminated through the disc drive connector.

These and various other features as well as advantages which characterize the present invention will be apparent upon reading of the following detailed description and review of the associated drawings.

DETAILED DESCRIPTION OF THE PREFERRED EMBODIMENTS

Figure 1:
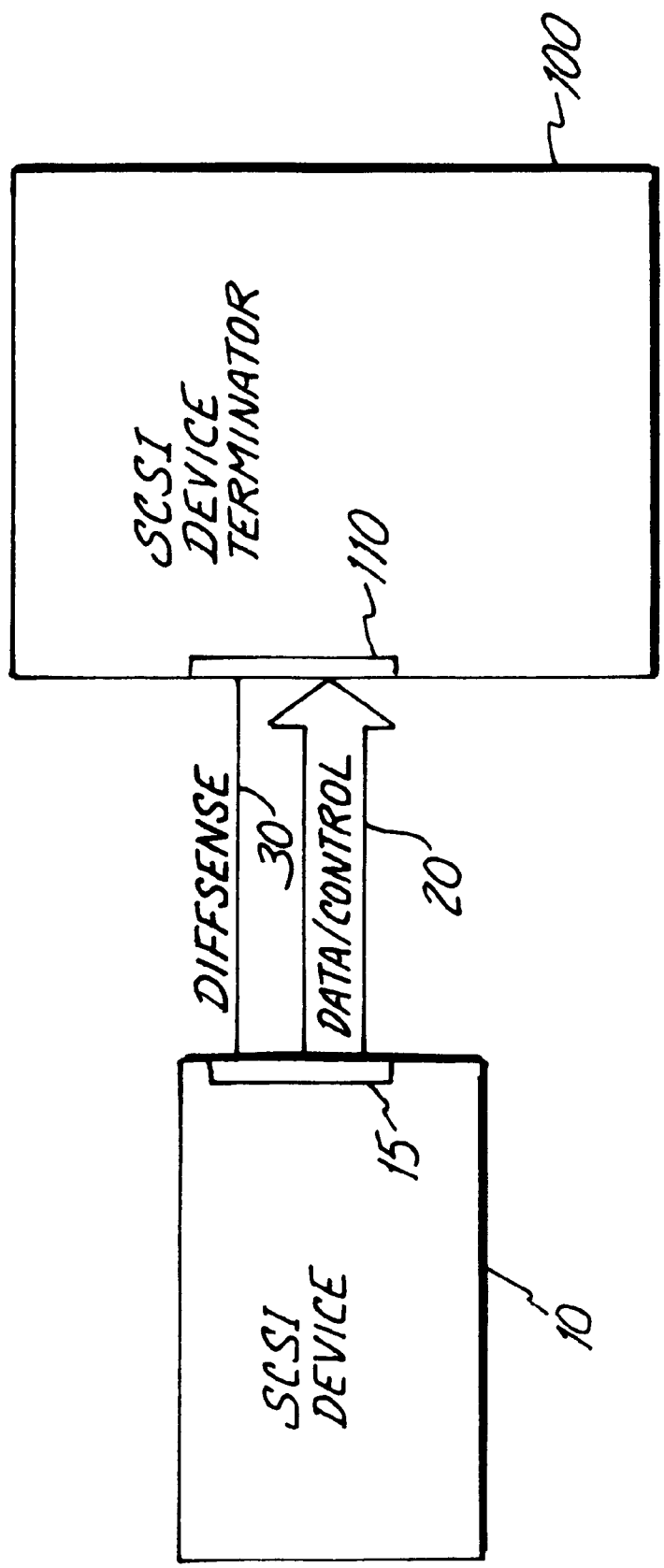
FIG. 1 is a block diagram illustrating a small computer system interface (SCSI) device terminator of the present invention terminating an SCSI device.

Referring now to FIG. 1, small computer system interface (SCSI) device terminator 100 is shown. Connector 110 of SCSI device terminator 100 is connected to connector 15 of SCSI device 10 so that terminator 100 can terminate data/control lines 20 of device 10. SCSI device 10 can be a single ended (SE) I/O device, a low-voltage differential (LVD) signal I/O device, or a high voltage differential (HVD) signal device. In preferred embodiments of the present invention, terminator 100 terminates data/control lines 20 of SCSI device 10 regardless of whether SCSI device 10 is an SE SCSI device, a LVD SCSI device or a HVD SCSI device.

SCSI device terminator 100 determines the type of SCSI device 10 as a function of the DIFFSENSE signal provided by device 10 on line 30. Terminator 100 identifies the particular type of device 10 by sensing the voltage level on DIFFSENSE line 30. If the voltage level on DIFFSENSE line 30 is below 0.7 V, terminator 100 assumes that device 10 is an SE SCSI device. If the voltage level on DIFFSENSE line 30 is between 0.8 V and 2.2 V, terminator 100 identifies device 10 as an LVD SCSI device. If the voltage level on DIFFSENSE line 30 is higher than 2.2 V, then terminator 100 identifies device 10 as an HVD SCSI device.

By automatically identifying device 10 as an SE SCSI device, an LVD SCSI device or an HVD SCSI device, and by automatically terminating device 10 based upon its determined type, device terminator 100 can be used with any of these types of SCSI devices. This allows device 10 to be used in conjunction with manufacturing test beds or racks, without concern for whether particular SCSI devices have been matched with the appropriate type of device terminator. Further, by providing more universal device termination, fewer device terminators will need to be kept in stock by disc drive manufacturers.

Figure 2:
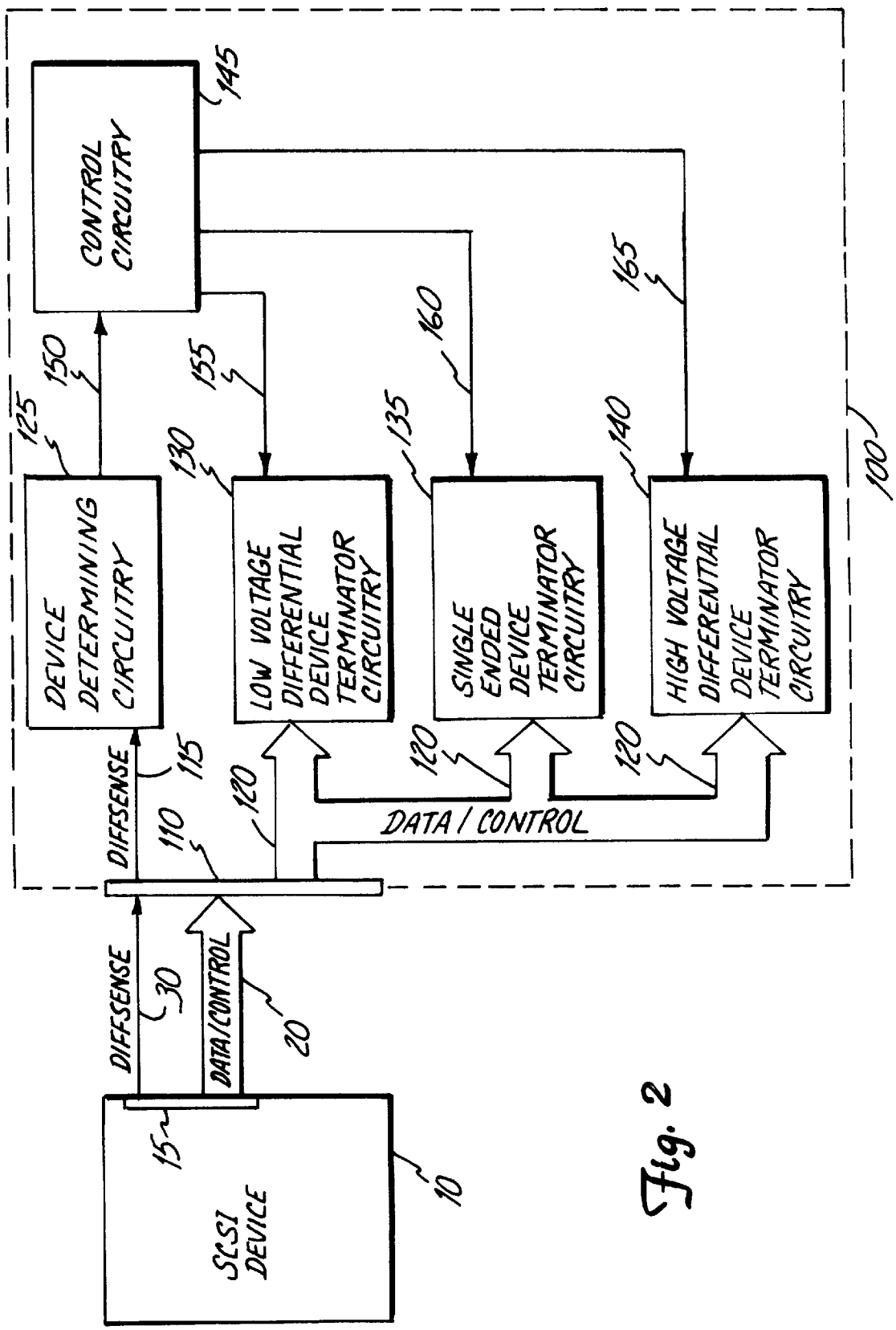
FIG. 2 is a block diagram illustrating in greater detail the SCSI device terminator shown in FIG. 1.

FIG. 2 is a block diagram illustrating one embodiment of SCSI device terminator 100 in greater detail. As was the case in FIG. 1, in FIG. 2 device 100 is illustrated as terminating SCSI device 10 via coupling of device connector 15 and terminator connector 110. Terminator 100 includes internal DIFFSENSE line 115 coupled to DIFFSENSE line 30 of SCSI device 10, internal data/control lines 120 coupled to data/control lines 20 of SCSI device 10, device determining circuitry 125, LVD device terminating circuitry 130, SE device terminating circuitry 135, HVD device terminating circuitry 140, control circuitry 145, and control signal lines 150, 155, 160 and 165.

Device determining circuitry 125 senses the voltage on DIFFSENSE line 115, and as a function of the sensed DIFFSENSE voltage, determines whether SCSI device 10 is an SE device, an LVD device or an HVD device. Device determining circuitry 125 provides an output signal on signal line 150 which is indicative of the determined type of device 10. Using the output signal from device determining circuitry 125, control circuitry 145 controls LVD device terminating circuitry 130, SE device terminating circuitry 135 and HVD device terminating circuitry 140 in order to properly terminate SCSI device 10 and to minimize power consumption. For example, if SCSI device 10 is an LVD device, control circuitry 145 uses control line 155 to turn on or apply power to LVD device terminating circuitry 130. Once turned on, LVD device terminating circuitry 130 terminates SCSI device 10 via the connection of data/control lines 20 and internal data/control lines 120. If desired, power consumption of terminator 100 can be minimized by turning off or reducing power to SE device terminating circuitry 135 and HVD device terminating circuitry 140 via control lines 160 and 165. If SCSI device 10 is determined to be either an SE device or an HVD device, control circuitry 145 would likewise provide power to the appropriate device terminating circuitry 135 or 140, and minimize power consumption by the other device terminating circuitry.

Figure 3:
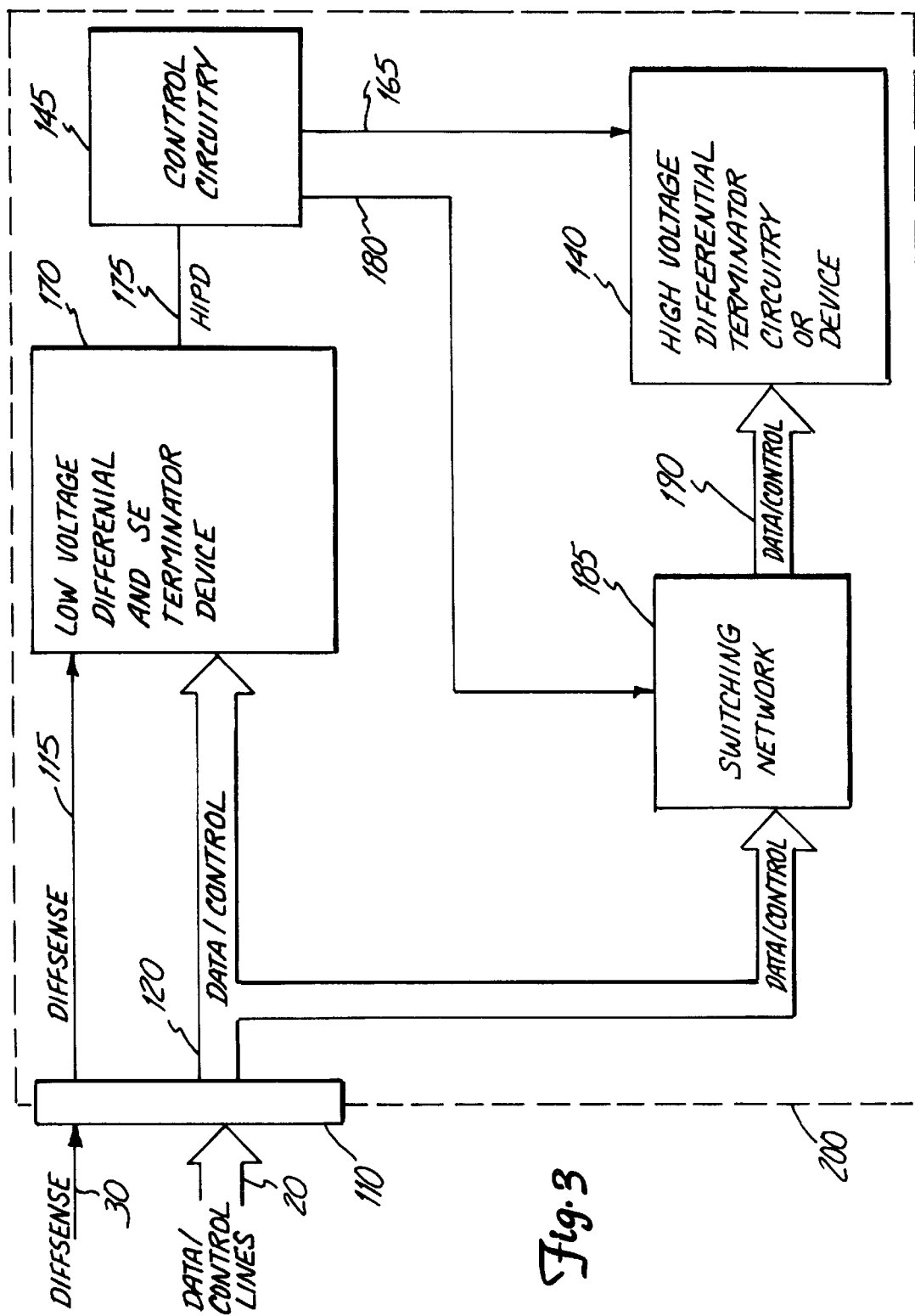
FIG. 3 is a block diagram illustrating a more particular embodiment of the SCSI device terminator of the present invention.

FIG. 3 is a block diagram illustrating SCSI device terminator 200, which is a more particular embodiment of SCSI device terminator 100 illustrated in FIGS. 1 and 2. SCSI device terminator 100 includes connector 110, internal DIFFSENSE line 115 coupled to DIFFSENSE line 30 of a terminated SCSI device, internal data/control lines 120 coupled to data/control lines 20 of the terminated SCSI device, control circuitry 145, LVD and SE terminating device 170, HVD terminating circuitry or device 140, and switching network 185. LVD and SE terminating device 170 can be any of a wide variety of devices available on the market which are designed to terminate both LVD and SE SCSI devices. For example, LVD and SE terminating device 170 can be an integrated circuit available from Unitrode under the part number UCC5630. HVD terminating circuitry can be, for example, a resistor network or a transistor network of the type known in the industry for HVD termination.

LVD and SE terminating devices such as the Unitrode UCC5630 are adapted to provide the device determining function provided by device determining circuitry 125 illustrated in FIG. 2. Therefore, if LVD and SE terminating device 170 determines from the voltage on DIFFSENSE line 115 that the terminated device is an LVD or an SE device, LVD and SE terminating device 170 provides the proper termination of data/control lines 20. In this instance, LVD and SE terminating device 170 provides, at high impedance differential (HIPD) output 175, a signal which identifies to control circuitry 145 that the terminated device is not an HVD device. In response, control circuitry 145 generates, on control lines 165 and 180, control signals which turn-off or minimize power consumption by HVD terminating circuitry 140 and switching network 185.

If LVD and SE terminating device 170 determines that the device to be terminated is an HVD SCSI device, then it automatically minimizes power consumption associated with termination of LVD and SE devices. At the same time, device 170 provides at HIPD output 175 a signal which identifies to control circuitry 145 the fact that the device to be terminated is an HVD SCSI device. In response, control circuitry 145 generates control signals on signal lines 165 and 180 which enable power to HVD terminating circuitry 140 and switching network 185. Since the industry standard connector pin configuration of HVD SCSI devices is different than the standard connector pin configuration of LVD and SE SCSI devices, data/control lines 20 of the terminated device are coupled via internal data/control lines 120 to switching network 185. Switching network 185 reconfigures the data/control lines into the HVD standard configuration, and then provides the reconfigured data/control lines 190 to HVD terminating circuitry 140. HVD terminating circuitry 140 then properly terminates the HVD SCSI device.

The present invention can be summarized in reference to the FIGS. which illustrate terminating apparatus 100, 200 adapted to terminate a parallel SCSI disc drive or other device 10 having a connector 15. The terminating apparatus includes termination circuitry or devices 130, 135 and 140 adapted to terminate data/control lines of SE SCSI devices, LVD SCSI devices, and HVD SCSI devices, respectively. The terminating apparatus also includes a first connector 110 coupled to the termination circuitry or devices 130, 135 and 140 and adapted to be coupled to data/control lines 20 of the SCSI device 10 through the device connector 15.

In some embodiments, terminating apparatus 100, 200 further includes device determining circuitry 125 adapted to determine whether SCSI device 10 is an SE device, an LVD device or an HVD device. In some embodiments, terminating apparatus 100, 200 further includes power control circuitry 145 adapted to reduce power used by HVD termination circuitry 140 if device determining circuitry 125 determines that SCSI device 10 is an SE SCSI device or an LVD SCSI device.

In some embodiments, device determining circuitry 125 is coupled to DIFFSENSE line 30 of SCSI device 10 through first connector 110 and device connector 15. In these embodiments, the device determining circuitry can determine whether device 10 is an SE device, an LVD device or an HVD device as a function of a voltage level on the DIFFSENSE line. In one particular embodiment, device determining circuitry 125 determines that SCSI device 10 is an SE device if the voltage level on DIFFSENSE line 30 is below 0.7 V, determines that device 10 is an LVD device if the voltage level on the DIFFSENSE line is between 0.8 V and 2.2 V, and determines that device 10 is an HVD device if the voltage level on the DIFFSENSE line is higher than 2.2 V.

In some embodiments, terminating apparatus 100, 200 further includes a switching network 185, coupled between HVD terminating circuitry 140 and first connector 110, adapted to convert the data/control line configuration from a first data/control line configuration corresponding to LVD and SE devices to a second data/control line configuration corresponding to HVD devices.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the terminating device while maintaining substantially the same functionality without departing from the scope and spirit of the present invention.

What is claimed is:

1. A terminating apparatus adapted to terminate a parallel small computer system interface (SCSI) device having a device connector, the terminating apparatus comprising:

a first connector adapted to be coupled to data/control lines of the SCSI device through the device connector;

SCSI device determining circuitry adapted to determine whether the SCSI device is an SE SCSI device, an LVD SCSI device or an HVD SCSI device;

termination circuitry coupled to the first connector and adapted to terminate the data/control lines of the SCSI device regardless of whether the SCSI device is a single ended (SE) SCSI device, a low voltage differential (LVD) SCSI device or a high voltage differential (HVD) SCSI device, the termination circuitry comprising:

LVD termination circuitry coupled to the connector and adapted to terminate the data/control lines of the SCSI device if the SCSI device is a LVD SCSI device;

SE termination circuitry coupled to the connector and adapted to terminate the data/control lines of the SCSI device if the SCSI device is a SE SCSI device; and HVD termination circuitry coupled to the connector and adapted to terminate the data/control lines of the SCSI device if the SCSI device is a HVD SCSI device; and a switching network coupled between the HVD termination circuitry and the first connector and adapted to convert a data/control line configuration from a first data/control line configuration corresponding to LVD and SE SCSI devices to a second data/control line configuration corresponding to HVD SCSI devices.

2. The terminating apparatus of claim 1, and further comprising power control circuitry adapted to reduce power used by the HVD termination circuitry if the device determining circuitry determines that the SCSI device is an SE SCSI device or an LVD SCSI device.

3. The terminating apparatus of claim 1, wherein the device determining circuitry is coupled to the DIFFSENSE line of the SCSI device through the first connector and the device connector, and wherein the device determining circuitry determines whether the SCSI device is an SE SCSI device, an LVD SCSI device or an HVD SCSI device as a function of a voltage level on the DIFFSENSE line.

4. The terminating apparatus of claim 3, wherein the device determining circuitry determines that the SCSI device is an SE SCSI device if the voltage level on the DIFFSENSE line is below 0.7 V, wherein the device determining circuitry determines that the SCSI device is an LVD SCSI device if the voltage level on the DIFFSENSE line is between 0.8 V and 2.2 V, and wherein the device determining circuitry determines that the SCSI device is an HVD SCSI device if the voltage level on the DIFFSENSE line is higher than 2.2 V.

5. An apparatus for terminating parallel small computer system interface (SCSI) devices, the apparatus comprising:

a first connector adapted to be coupled to an SCSI device connector of a first SCSI device and thereby to data/control lines of the first SCSI devices;

low voltage differential (LVD) termination circuitry coupled to the first connector and adapted to terminate the data/control lines of the first SCSI device if the first SCSI device is an LVD SCSI device;

single ended (SE) termination circuitry coupled to the first connector and adapted to terminate the data/control lines of the first SCSI device if the first SCSI device is an SE SCSI device;

high voltage differential (HVD) termination circuitry coupled to the first connector and adapted to terminate the data/control lines of the first SCSI device if the first SCSI device is an HVD SCSI device; and a switching network coupled between the HVD termination circuitry and the first connector for converting a data/control line configuration from a first data/control line configuration corresponding to LVD and SE SCSI devices to a second data/control line configuration corresponding to HVD SCSI devices.

6. The terminating apparatus of claim 5, and further comprising power control circuitry adapted to reduce power used by the HVD termination circuitry if the SCSI device determining circuitry determines that the SCSI device is an SE SCSI device or an LVD SCSI device.

7. The terminating apparatus of claim 5, wherein the SCSI device determining circuitry is coupled to the DIFFSENSE line of the first SCSI device through the first connector and the device connector, and wherein the SCSI device determining circuitry determines whether the first SCSI device is an SE SCSI device, an LVD SCSI device or an HVD SCSI device as a function of a voltage level on the DIFFSENSE line.

* * * * *

UNITED STATES PATENT AND TRADEMARK OFFICE
CERTIFICATE OF CORRECTION

PATENT NO.   : 6,125,414
DATED        : September 26, 2000
INVENTOR(S)  : Ali Abbas It is certified that error appears in the above-identified patent and that said Letters Patent is hereby corrected as shown below:

Column 6,
Line 17, after "SCSI", delete "devices", and insert -- device --.

Signed and Sealed this

Twenty-fifth Day of December, 2001

*Attest:*

*Attesting Officer*

JAMES E. ROGAN
*Director of the United States Patent and Trademark Office*